(No Model.)  C. F. BRUSH.  3 Sheets—Sheet 1.
SECONDARY BATTERY.
No. 274,082.  Patented Mar. 13, 1883.
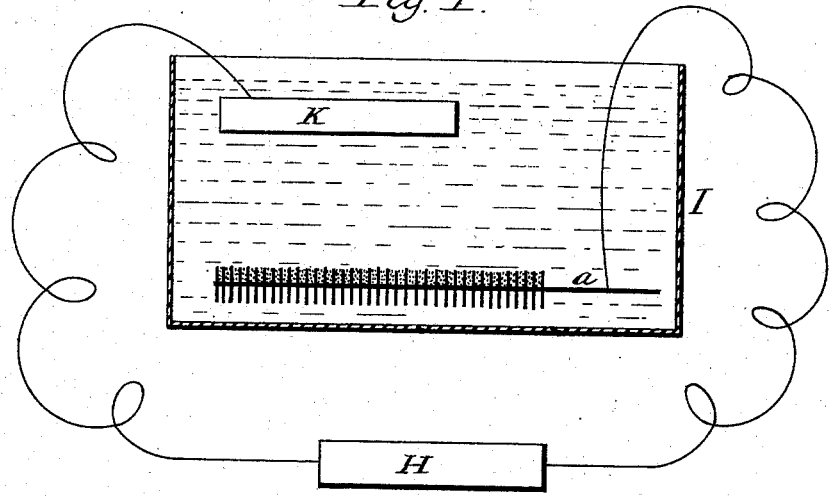

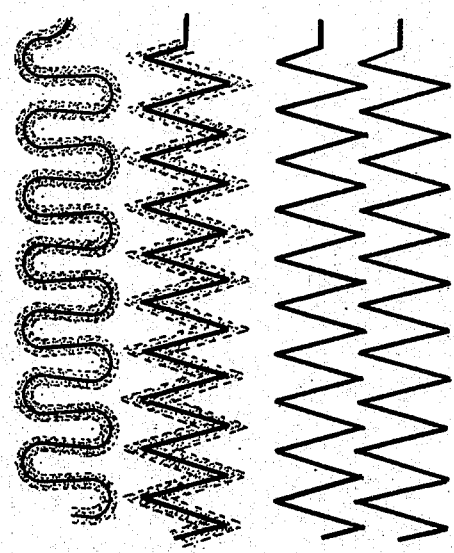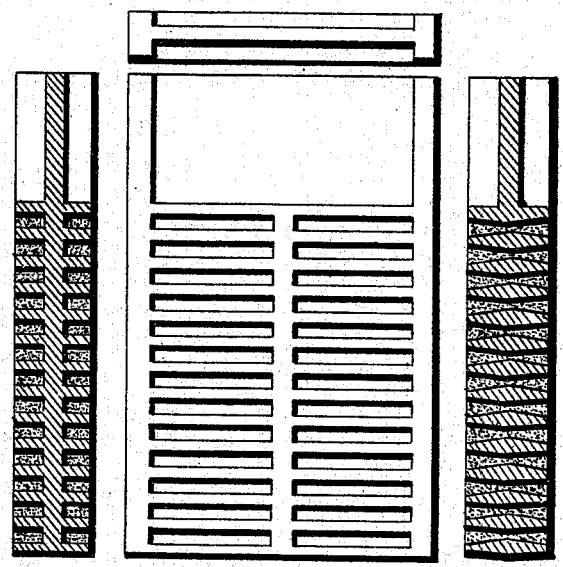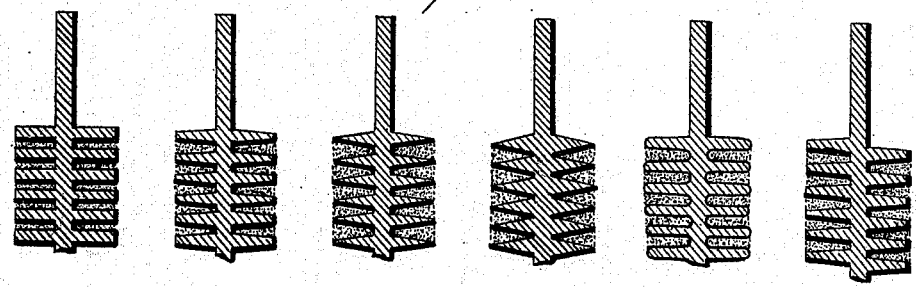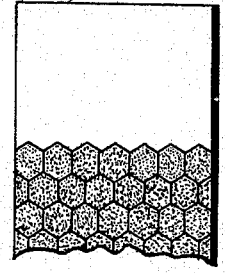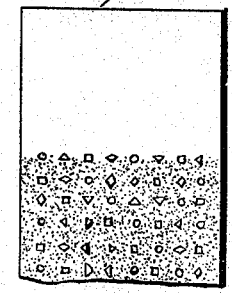

(No Model.)
C. F. BRUSH.
SECONDARY BATTERY.
No. 274,082. Patented Mar. 13, 1883.
3 Sheets—Sheet 3.
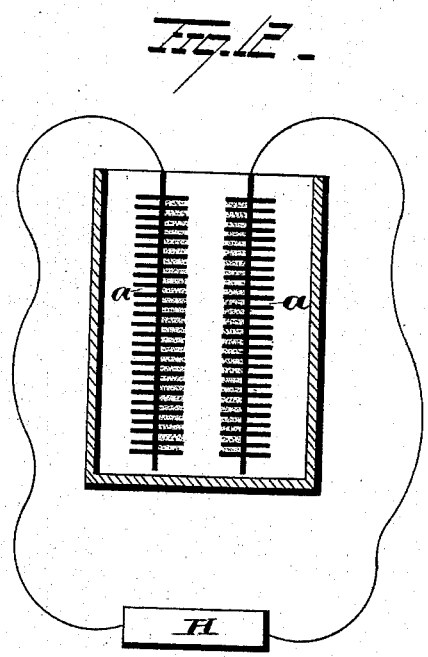

UNITED STATES PATENT OFFICE.

CHARLES F. BRUSH, OF CLEVELAND, OHIO.

SECONDARY BATTERY.

SPECIFICATION forming part of Letters Patent No. 274,082, dated March 13, 1883.

Application filed June 9, 1881. (No model.) Patented in England July 1, 1882, in Belgium July 22, 1882, in France July 26, 1882, and in Italy September 30, 1882.

*To all whom it may concern:*

Be it known that I, CHARLES F. BRUSH, of Cleveland, in the county of Cuyahoga and State of Ohio, have invented certain new and useful Improvements in Secondary Batteries, (Case E;) and I do hereby declare the following to be a full, clear, and exact description of the invention, such as will enable others skilled in the art to which it pertains to make and use it, reference being had to the accompanying drawings, which form part of this specification.

My invention relates to secondary batteries or apparatus for the absorption of electric energy and subsequent exhibition thereof; and it consists in providing the plates or elements of which such apparatus is made with a suitably thick coating of electrically-deposited coherent metal previous to the process of "forming" the plates. All electrically-deposited metal is more or less porous, as is well known, and this porosity, especially in the case of lead, greatly facilitates the penetration of the electrical action when secondary-battery elements thus coated are submitted to a forming or developing process.

In preparing or coating plates with coherent porous lead according to my present invention the latter is deposited thereon in the manner customary in any ordinary process of electroplating, the plates to be coated first being made chemically clean and the plating solution consisting of oxide of lead dissolved in a solution of a caustic alkali or of an equivalent solution of lead. Any solution of lead may be used, provided that it is such as to produce a coherent deposit of metal, and not a spongy or non-coherent deposit. The latter kind of deposit possesses properties quite different from those of the coherent form of metal, and its application in the construction of secondary batteries constitutes the subject of another application for Letters Patent. The coherent metal may be deposited with greater or less rapidity, as may be found most expedient or desirable in practice, the character of the deposit varying to some extent, according to the rate and other circumstances of its formation. A hot solution of the metal may be worked more rapidly than a cold solution. Not only plain plates of suitable electro-conducting material, but corrugated plates and plates studded or ribbed or slotted or otherwise perforated, or in any manner made cellular, may be employed to receive and support or sustain the coherent porous metal. Ribbed, cellular, and perforated plates are well adapted for the purpose, and the cells or perforations or spaces between the ribs may be nearly or quite filled with the deposit, if desired.

In the accompanying drawings, Figure 1 is a diagram showing a simple method of lining or filling the grooves in a ribbed plate with the deposited metal. Fig. 2 shows a corrugated plate having its grooves or receptacles filled with the deposited metal. Fig. 3 illustrates an angularly-corrugated plate or element embodying my invention. Fig. 4 represents two angularly-corrugated plates with their folds entering each other. Fig. 5 is a ribbed plate, the ribs being of less thickness than the central portion of the plate or support. Fig. 6 represents a plan and top view of a ribbed plate. Fig. 7 shows a vertical section of a perforated or slotted plate. Fig. 8 illustrates several different forms of ribbed plates. Fig. 9 shows a honey-comb plate; Fig. 10, a studded plate, and Fig. 11 a ribbed corrugated plate. Fig. 12 represents a battery provided with plates or elements constructed in accordance with my invention.

The plate $a$, being first thoroughly cleaned, has the grooves on one of its sides filled with protoxide or other suitable compound of lead, either dry or made into a paste with water or saline solution. The plate is then placed horizontally (prepared side up) in a suitable vessel, I, containing a solution of caustic soda or potassa or other alkali, when protoxide of lead is used in the grooves. Any liquid may be used, provided it is capable of dissolving the lead compound, whatever it may be, in the grooves or corrugations of the plate $a$, and of depositing the metal when electrolyzed in a coherent state. In the same solution, but not touching the plate $a$, is suspended or placed a lead or equivalent plate, K. Current from a suitable source, H, is then passed through the apparatus in the proper direction, until the lead oxide in the grooves or corrugations is exhausted and its metal deposited on the sides and bottom of the grooves. More lead oxide may be added if it is desired to increase the deposit. The solution may be heated to hasten or facilitate the process, if found expedient. When one side of the plate is prepared, the other side may be treated in the same manner. By this method a strong solution of lead is maintained within the grooves or corrugations, while other portions of the solution remain poor in metal, whereby a heavy deposit of metal is secured on the sides and bottom of the grooves. If a grooved plate is simply suspended in a solution of lead oxide, and thus treated, the principal deposit of metal will occur on the exposed edges of the ribs, and comparatively little metal will be deposited within the grooves. Plates of other metals than lead may be employed to receive and support the deposited lead. Thus gold or platinum may be used, and in this case the oxygen element of the battery, if fully peroxidized, cannot lose its charge by spontaneous "local action." Carbon, or even copper, may be used in the case of the hydrogen plate or element of the battery for receiving the deposited metal. When lead or other plates coated or filled with deposited coherent lead are associated together in a secondary battery and charged, the reduced metal of one of the plates is peroxidized much faster than ordinary cast or rolled lead, but not nearly so fast as spongy or non-coherent lead, while the porous metal of the other plate absorbs hydrogen somewhat more freely than cast or rolled lead, but with far less ease than spongy lead. The hydrogen plate does not develop capacity nearly so fast as does the oxygen plate, and hence it becomes necessary to resort to a forming or developing process. The best results in this direction are reached by fully peroxidizing both of the plates, and then reversing the charge in one of them, thus reducing the peroxide thereon and producing a hydrogen element. Frequent reversal of charge, such as is customary in the usual forming process, should be avoided. Metals other than lead may constitute the deposited porous metal. Any metal may be used which is capable of peroxidation in charging and of reduction to a state of lower oxidation in discharging, the liquid of the battery being such as not to dissolve the oxides.

The invention set forth in the foregoing specification is described in foreign patents granted to me as follows: Great Britain July 1, 1882; France July 26, 1882; Belgium July 22, 1882, and Italy September 30, 1882.

I make no broad claim in this patent to a secondary-battery plate or element consisting of a support provided with a coating of electrically-deposited metal. Neither do I claim a secondary-battery plate or element consisting of a support provided with a coating of electrically-deposited "spongy" lead or metal obtained by applying to a chemically clean plate sulphate of lead, acetate of lead, or nitrate of lead, then immersing the plate in a saline solution, and by electrical action reducing the lead to the spongy metallic state, or, instead of the above solutions, employing any solution of lead adapted to produce a spongy deposit of metal lead.

The broad and specific subjects-matter above referred to are described and claimed in my application designated as "Case D," filed of even date herewith. The "coherent" lead described and claimed in this case is strongly tenacious to its plate or support, and, while sufficiently porous, is quite dense and firm in its structure, thereby constituting a coating or filling not at all liable to become detached from the plate by scraping or jolting, nor to become disintegrated in the continued charging and discharging of the battery in its normal use.

Having fully described my invention, what I claim as new, and desire to secure by Letters Patent, is—

1. A secondary-battery element composed of a suitable body, frame, or support provided with a coating consisting, primarily, of electrically-deposited coherent lead, or other suitable metal, in combination with a battery-fluid in which said coating is insoluble, substantially as set forth.

2. A secondary-battery element composed of a suitable body, frame, or support constructed with cells, grooves, perforations, or other receptacles, having a coating or filling consisting, primarily, of electrically-deposited coherent lead, or other suitable metal, in combination with a battery-fluid in which the coating or filling is insoluble, substantially as set forth.

3. A secondary-battery element composed of a body, frame, or support constructed of lead, provided with a coating consisting, primarily, of electrically-deposited coherent lead, in combination with a battery-fluid in which said coating is insoluble, substantially as set forth.

4. A secondary-battery element composed of a body, frame, or support constructed of lead, provided with cells, grooves, perforations, or other receptacles, having a coating or filling consisting, primarily, of electrically-deposited coherent lead, or other suitable metal, in combination with a battery-fluid in which the said coating is insoluble, substantially as set forth.

5. A secondary battery consisting of two or more plates or supports, each provided with a coating consisting, primarily, of electrically-deposited coherent lead, immersed in a battery-fluid in which said coating is insoluble, substantially as set forth.

6. A secondary-battery element composed of a suitable body, frame, or support having a coating of electrically-deposited coherent lead, or other suitable metal, electrically "formed" or rendered active, in combination with a battery-fluid in which said coating is insoluble, substantially as set forth.

7. In a method of making a secondary-battery element, applying to a suitable frame, body, or support a metallic oxide in an alkaline solution, and reducing the oxide to the metallic state by electrical action, and thereby producing a coating or filling of coherent metal, substantially as set forth.

8. In a method of making a secondary-battery element, applying to a suitable frame, body, or support oxide of lead in an alkaline solution, and reducing the oxide of lead to metallic lead by electrical action, and thereby producing a coating or filling of coherent lead, substantially as set forth.

In testimony whereof I have signed my name to this specification in the presence of two subscribing witnesses.

CHARLES F. BRUSH.

Witnesses:
 JNO. CROWELL, Jr.,
 ERNEST O. ORSBURN.